(12) United States Patent
Xu et al.

(10) Patent No.: US 12,447,234 B1
(45) Date of Patent: Oct. 21, 2025

(54) EXTRACELLULAR MATRIX HYDROGEL MICROSPHERE, AND PREPARATION METHOD AND APPLICATION THEREOF

(71) Applicant: SUZHOU XIANJUE NEW MATERIALS TECHNOLOGY CO., LTD., Suzhou (CN)

(72) Inventors: Yong Xu, Suzhou (CN); Fan He, Suzhou (CN); Lirong Zhang, Suzhou (CN); Xinfeng Zhou, Suzhou (CN)

(73) Assignee: SUZHOU XIANJUE NEW MATERIALS TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/098,518

(22) Filed: Apr. 2, 2025

Related U.S. Application Data

(63) Continuation of application No. PCT/CN2025/081851, filed on Mar. 11, 2025.

(30) Foreign Application Priority Data

Jun. 17, 2024 (CN) .......................... 202410775843.2

(51) Int. Cl.
| | |
|---|---|
| A61L 27/36 | (2006.01) |
| A61L 27/26 | (2006.01) |
| A61L 27/52 | (2006.01) |
| C08L 5/08 | (2006.01) |
| C08L 89/06 | (2006.01) |
| C12N 5/00 | (2006.01) |
| C12N 5/0775 | (2010.01) |

(52) U.S. Cl.
CPC ........... *A61L 27/3633* (2013.01); *A61L 27/26* (2013.01); *A61L 27/52* (2013.01); *C08L 5/08* (2013.01); *C08L 89/06* (2013.01); *C12N 5/0018* (2013.01); *C12N 5/0663* (2013.01); *A61L 2300/64* (2013.01); *A61L 2430/02* (2013.01); *A61L 2430/40* (2013.01); *C12N 2500/38* (2013.01)

(58) Field of Classification Search
None
See application file for complete search history.

(56) References Cited

U.S. PATENT DOCUMENTS

2020/0030493 A1* 1/2020 Badylak .............. A61L 27/3687

FOREIGN PATENT DOCUMENTS

| CN | 112089889 A | 12/2020 |
|---|---|---|
| CN | 116942912 A | 10/2023 |
| CN | 117757125 A | 3/2024 |

* cited by examiner

*Primary Examiner* — David J Blanchard
*Assistant Examiner* — Daniel F Coughlin
(74) *Attorney, Agent, or Firm* — Nitin Kaushik

(57) ABSTRACT

The present disclosure relates to the field of biomaterial technology, and discloses an extracellular matrix hydrogel microsphere and a preparation method thereof. The method includes: constructing a neonatal rat bone marrow mesenchymal stem cell-derived extracellular matrix; preparing hydrogel microspheres by microfluidic technique; and using a condensing agent DMTMM to activate carboxyl groups on surfaces of hydrogel microspheres, and making the activated hydrogel microspheres react with amino groups of the extracellular matrix to obtain extracellular matrix hydrogel microspheres. The present disclosure constructs an extracellular matrix hydrogel microsphere, which realizes the advantage complementary between a hydrogel and a stem cell-derived extracellular matrix, and retains the biocompatibility of a hydrogel precursor material while having mechanical properties. By combining a hydrogel microsphere with an extracellular matrix, bone formation of bone marrow mesenchymal stem cells in vitro may be significantly promoted, and osteoclast differentiation is inhibited, which provides more possibilities for cranial defect repair.

6 Claims, 3 Drawing Sheets

EXTRACELLULAR MATRIX HYDROGEL MICROSPHERE, AND PREPARATION METHOD AND APPLICATION THEREOF

CROSS-REFERENCE TO RELATED APPLICATIONS

The application claims priority to Chinese patent application No. 202410775843.2, filed on Jun. 17, 2024, the entire contents of which are incorporated herein by reference.

TECHNICAL FIELD

The present disclosure relates to the technical field of biomaterials, in particular to an extracellular matrix hydrogel microsphere, and a preparation method and an application thereof.

BACKGROUND

Bone tissue, as a hard tissue of a human body, supports various human activities and protects various organs in daily life. In addition, bone tissue plays a role in maintaining calcium-phosphorus balance in the body. According to classical definition, a critical-size defect refers to a smallest size tissue defect that does not completely heal during an animal's natural lifespan. A critical-size bone defect remains a significant health challenge for an elderly patient. Bone marrow-derived mesenchymal stem cells (BMSCs) are one of main endogenous repair cells in the occurrence of bone defects. However, elderly patient-derived BMSCs have a significantly reduced capacity for tissue repair, it is usually difficult to achieve self-repair, and the repair of bone defects must be promoted by means of treatment. In the current clinical treatment of bone defects, autologous bone graft and bone allograft are the most common methods of bone repair. However, the bone grafting methods have some limitations such as limited supply source, self-incurred rejection and limited immune response. Moreover, autologous bone graft is not effective in ameliorating the decreased bone regeneration ability of elderly patients. These shortcomings limit the development of bone defect repair, which causes great distress in the lives of elderly patients. Therefore, improving the bone repair ability of elderly patients by means of tissue engineering techniques will become an effective means of curing senile bone defects.

A stem cell-derived extracellular matrix (ECM) is a promising candidate biomaterial for bone tissue engineering. In an aspect, compared with a tissue-derived extracellular matrix, the stem cell-derived extracellular matrix is more controllable in terms of quality, and may avoid the transmission risk due to morbidity of a donor site of the tissue-derived extracellular matrix or pathogens from the donor site of the tissue-derived extracellular matrix. In another aspect, the stem cell-derived extracellular matrix mainly includes collagen and various matrix components such as collagen, fibrin and elastin, which is similar to an oil phase of bone tissue. Bone homeostasis is maintained by a balance between osteoblast-mediated bone formation and osteoclast-mediated bone resorption. The stem cell-derived extracellular matrix not only significantly promotes bone formation of BMSCs in vitro, but also effectively inhibits osteoclast differentiation. However, an extracellular matrix, which is obtained by culturing mesenchymal stem cells (MSCs) on tissue culture-treated polystyrene (TCPS), is often difficult to directly apply to bone defect repair in vivo due to poor mechanical properties.

Hydrogels are a type of polymer materials with a three-dimensional network structure, and show great potential in the field of tissue engineering due to properties such as good biocompatibility, good biodegradability and tunable mechanical properties. Hyaluronic acid (HA) is a natural extracellular matrix component with good biocompatibility and tunable mechanical properties. Hyaluronic acid methacrylate (HAMA) can be prepared by introducing a methacryl group into a molecular chain of hyaluronic acid. Hyaluronic acid methacrylate not only retains the excellent biological properties of hyaluronic acid, but also can be rapidly cross-linked and cured under ultraviolet light to form a hydrogel. A hyaluronic acid methacrylate molecule has an abundance of carboxyl groups and hydroxyl groups, which enables the hyaluronic acid methacrylate molecule to undergo diverse chemical modifications.

In addition, gelatin methacryloyl (GelMA), alginate methacrylate (AlgMA), methacryloylated sericin protein, silk fibroin methacryloyl (SilMA), chondroitin sulfate methacryloyl (ChsMA), and collagen methacrylate (ColMA), etc. also have good biocompatibility and can be chemically modified. However, conventional bulk hydrogels suffer from excessive external dimensions (in millimeters and up), long cell culture cycles, need for surgical implantation, excessive postoperative trauma, etc. Compared with the conventional bulk hydrogels, hydrogel microspheres not only retain most of the original properties of the conventional bulk hydrogels, but also show certain unique advantages, such as larger specific surface areas, superior injectability, more significant structural porosities and more convenient modular design. Therefore, the hydrogel microspheres are more suitable for bone tissue engineering than the conventional block hydrogels. The hydrogels can be prepared into injectable-sized hydrogel microspheres by means of microfluidic technique. Nevertheless, hyaluronic acid, gelatin, silk fibroin inherently, etc. lack certain bioactivities, which limits the therapeutic effects of the hydrogel microspheres in bone defect repair.

SUMMARY

The present disclosure provides an extracellular matrix hydrogel microsphere, which may overcome the defects of poor mechanical properties of an extracellular matrix and insufficient bioactivity of hydrogel microspheres in repairing bone defects.

The present disclosure provides a method for preparing an extracellular matrix hydrogel microsphere. The method comprises:

constructing a neonatal rat bone marrow mesenchymal stem cell-derived extracellular matrix; preparing hydrogel microspheres by means of microfluidic technique; and using 4-(4,6-dimethoxy-1,3,5-triazin-2-yl)-4-methylmorpholinium chloride (DMTMM) as a condensing agent to activate carboxyl groups on surfaces of the hydrogel microspheres, and making the activated hydrogel microspheres react with amino groups of the extracellular matrix to obtain extracellular matrix hydrogel microspheres.

Preferably, using the 4-(4,6-dimethoxy-1,3,5-triazin-2-yl)-4-methylmorpholinium chloride (DMTMM) as the condensing agent to activate the carboxyl groups on the surfaces of the hydrogel microspheres, and making the activated hydrogel microspheres react with the amino groups of the extracellular matrix to obtain the extracellular matrix hydrogel microspheres, comprise following steps:

S1, immersing the hydrogel microspheres in a DMTMM solution, and performing stirring at room temperature and centrifugation to obtain a precipitate; and performing lyophilization on the extracellular matrix, thoroughly grinding the lyophilized extracellular matrix, and dissolving the ground extracellular matrix by using sterile deionized water to obtain an extracellular matrix suspension;

and S2, adding the precipitate to the extracellular matrix suspension for reaction on a shaker.

Preferably, constructing the neonatal rat bone marrow mesenchymal stem cell-derived extracellular matrix, specifically comprises the following steps:

S11, inoculating neonatal rat-derived bone marrow mesenchymal stem cells into a cell culture dish, and culturing the inoculated neonatal rat-derived bone marrow mesenchymal stem cells by using a complete medium until a cell density reaches 90%;

S12, adding ascorbic acid at a concentration of 80-200 μM to the complete medium for induction for 3-10 d;

S13, removing the complete medium and adding a decellularization solution for incubation;

S14, removing the decellularization solution, and adding a deoxyribonuclease for further incubation;

S15, removing the deoxyribonuclease, and performing washing by using a phosphate buffer solution (PBS); and S16, using a cell scraper to collect the extracellular matrix.

Preferably, in S13, the decellularization solution contains PBS at a volume fraction of 99.5%, Triton X-100 at a volume fraction of 0.5%, and $NH_4OH$ at a concentration of 20-35 mM; and an incubation time is 5-10 min. In S14, a concentration of the deoxyribonuclease is 80-150 U/ml, and an incubation time is 1-3 h.

Preferably, preparing the hydrogel microspheres by means of microfluidic technique, comprises following steps:

S21, preparing the hydrogel precursor solution as the aqueous phase by using the deionized water containing the photoinitiator;

S22, uniformly mixing Span 80 with isopropyl myristate to serve as an oil phase;

S23, filling the aqueous phase and the oil phase into respective injectors, and adjusting and controlling different flow rates by using syringe pumps to push out the aqueous phase and the oil phase at constant speeds, and curing the aqueous phase into stable spheres by means of an ultraviolet lamp so as to obtain the hydrogel microspheres;

S24, washing the surfaces of the hydrogel microspheres by using ethanol; and

S25, collecting and lyophilizing the washed hydrogel microspheres.

Preferably, the hydrogel precursor solution in S21 comprises one or more of hyaluronic acid methacrylate with a concentration of 1%-5%, gelatin methacryloyl with a concentration of 5%-20%, silk fibroin methacryloyl with a concentration of 7.5%-20%, and collagen methacrylate with a concentration of 1%-20%.

In some embodiments, in S1, the DMTMM solution is prepared by using sterile deionized water and has a concentration of 5-15 mg/mL, a stirring time at room temperature is 30-60 min, and the centrifugation is performed at 1200 r/min for 5 min at 4° C. and repeated three times.

In some embodiments, in S2, a reaction temperature is 4-25° C., and a reaction time is 3-8 h.

An extracellular matrix hydrogel microsphere is obtained by using the method described above.

The extracellular matrix hydrogel microsphere is applied in a product for bone defect repair.

By using the above-described technical solutions, the present disclosure has following significant technical effects.

The present disclosure prepares an extracellular matrix hydrogel microsphere. The extracellular matrix hydrogel microsphere realizes the advantage complementary between a hydrogel and a stem cell-derived extracellular matrix, which retains the biocompatibility of a hydrogel precursor material while having mechanical properties. By combining a hydrogel microsphere with an extracellular matrix, the extracellular matrix hydrogel microsphere may significantly promote bone formation of bone marrow mesenchymal stem cells in vitro and inhabit osteoclast differentiation, which provides more possibilities for cranial defect repair.

DETAILED DESCRIPTION OF THE EMBODIMENTS

In order to further explain the content of the present disclosure, the present disclosure is described in detail in conjunction with the accompanying drawings and embodiments below. It will be understood that the embodiments herein are merely explanations of the present disclosure, and should not be construed as limitations to the present disclosure.

Embodiment 1

Figure 1:
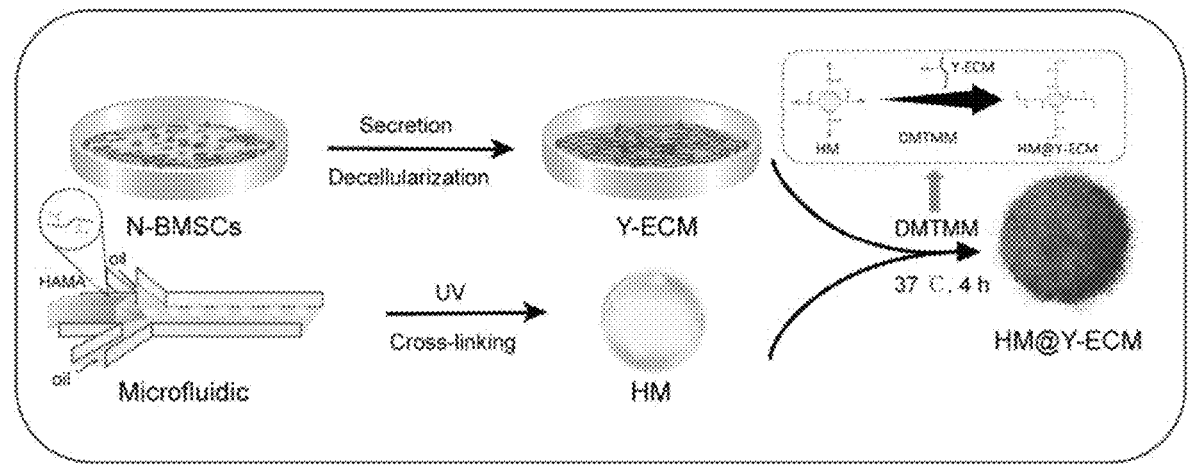
FIG. 1 shows the construction of a young state extracellular matrix in Embodiment 1 of the present disclosure.

As shown in FIG. 1, a method for preparing an extracellular matrix hydrogel microsphere includes:

constructing a neonatal rat bone marrow mesenchymal stem cell-derived extracellular matrix; preparing hydrogel microspheres by means of microfluidic technique; and using 4-(4,6-dimethoxy-1,3,5-triazin-2-yl)-4-methylmorpholinium chloride (DMTMM) as a condensing agent to activate carboxyl groups on surfaces of the hydrogel microspheres, and making the activated hydrogel microspheres react with amino groups of the extracellular matrix to obtain extracellular matrix hydrogel microspheres.

The method specially includes following steps.

In a step 101, neonatal rat bone marrow mesenchymal stem cells are cultured in a culture dish at an inoculation density of $3000/cm^2$; when a cell confluence reaches 90%, ascorbic acid at a concentration of 100 μM is added for induction for 8 d; then, a decellularization solution is added for incubation in an incubator for 5 min, the decellularization solution containing PBS at a volume fraction of 99.5%, Triton X-100 at a volume fraction of 0.5% and $NH_4OH$ at a concentration of 20 mM; the decellularization solution is removed, and a deoxyribonuclease at a concentration of 100 U/mL is added for further incubation for 1 h; and washing is performed by using a phosphate buffer solution (PBS), and an extracellular matrix is collected by means of a cell scraper. In a step 102, a hyaluronic acid methacrylate (HAMA) hydrogel solution at a concentration of 5% is prepared by using a solution of a photoinitiator lithium phenyl (2,4,6-trimethylbenzoyl) phosphinate (LAP), and HAMA hydrogel microspheres are prepared by microfluidic technique. This step specially includes the following steps.

In S21, a hydrogel precursor solution is prepared by using deionized water containing the photoinitiator to serve as a aqueous phase.

In S22, Span 80 is uniformly mixing with isopropyl myristate so as to serve as an oil phase.

In S23, the aqueous phase and the oil phase are filled into an injector, and then pushed out at constant speeds by adjusting and controlling different flow rates by using syringe pumps, and the aqueous phase is cured into stable spheres by means of an ultraviolet lamp.

In S24, the surfaces of the hydrogel microspheres are washed by using ethanol.

In S25, the washed hydrogel microspheres are collected and lyophilized.

In a step 103, the extracellular matrix is lyophilized, fully ground and well dissolved by using sterile deionized water to obtain an extracellular matrix suspension.

In a step 104, the hyaluronic acid methacrylate hydrogel microspheres are immersed in a DMTMM solution, and stirring at room temperature and centrifugation are performed for three times so as to obtain a precipitate. The DMTMM solution is prepared by using sterile deionized water and has a concentration of 5-15 mg/mL, a stirring time at room temperature is 30-60 min, and the centrifugation is performed at 1200 r/min for 5 min at 4° C.

In a step 105, the precipitate is added into the extracellular matrix suspension for reaction on a shaker at a temperature of 4-25° C. for 4 h.

In a step 106, the hyaluronic acid methacrylate extracellular matrix hydrogel microspheres are collected and washed by using sterile deionized water.

In a step 107, the extracellular matrix hydrogel microspheres are lyophilized to obtain the extracellular matrix hydrogel microspheres.

Figure 3:
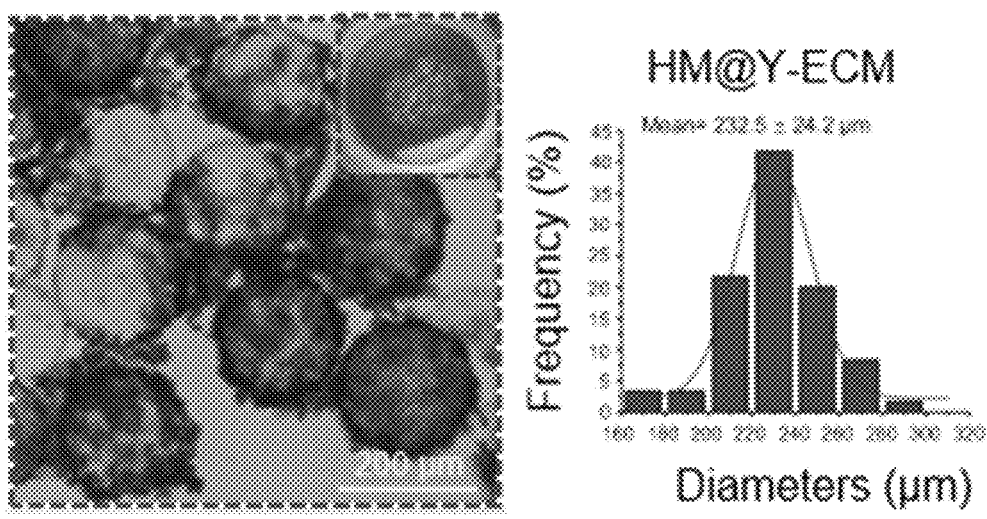
FIG. 3 shows a light microscopy image and a particle size distribution graph of extracellular matrix hydrogel microspheres in Embodiment 1 of the present disclosure.
Figure 4:
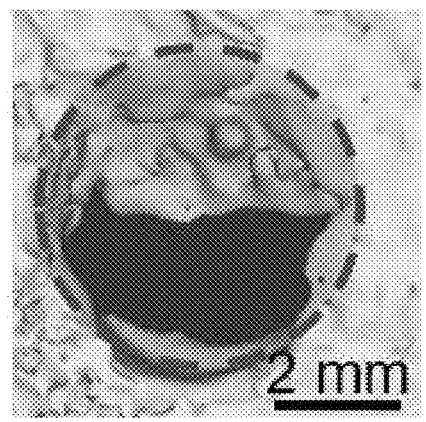
FIG. 4 shows a therapeutic effect image for Embodiment 1 of the present disclosure assessed by means of Micro-CT.

Herein, light microscopy photographing, Coomassie Brilliant Blue staining and Type I collagen immunofluorescent staining are performed on the extracellular matrix hydrogel microspheres prepared in this embodiment. The results show that, the stem cell-derived extracellular matrix is successfully combined with the hyaluronic acid methacrylate hydrogel microspheres (FIG. 2) in the present disclosure; the extracellular matrix hydrogel microspheres obtained in the present disclosure have homogeneous particle sizes and good dispersibility (FIG. 3); and the micro-CT result shows that the young state extracellular matrix hydrogel microspheres can effectively promote the repair of a cranial defect in an aged rat in vivo (FIG. 4).

The extracellular matrix hydrogel microspheres prepared in this embodiment successfully realize the effective combination of a stem cell-derived extracellular matrix and hydrogel microspheres. The youth state extracellular matrix hydrogel microspheres obtained by the method may effectively improve the bone regeneration ability of aged rats and promote the repair of critical cranial defects. The present disclosure provides a new idea for the use of a stem cell-derived extracellular matrix in cell and tissue engineering research, and expands the application range of hydrogel microspheres.

Embodiment 2

The relevant steps are the same as those in Embodiment 1. The difference between this embodiment and Embodiment 1 lies in that, in a step 101 in this embodiment, $NH_4OH$ in a decellularization solution is at a concentration of 10 mM, and incubation in an incubator is performed for 5 min.

Embodiment 3

The relevant steps are the same as those in Embodiment 1. The difference between this embodiment and Embodiment 1 lies in that, in a step 101 in this embodiment, $NH_4OH$ in a decellularization solution is at a concentration of 35 mM, and incubation in an incubator is performed for 5 min.

Embodiment 4

The relevant steps are the same as those in Embodiment 1. The difference between this embodiment and Embodiment 1 lies in that, in a step 101 in this embodiment, $NH_4OH$ in a decellularization solution is at a concentration of 20 mM, and incubation in an incubator is performed for 10 min.

Embodiment 5

The relevant steps are the same as those in Embodiment 1. The difference between this embodiment and Embodiment 1 lies in that, in a step 101 in this embodiment, deoxyribonuclease is at a concentration of 80 U/mL, and incubation is performed for 1 h.

Embodiment 6

The relevant steps are the same as those in Embodiment 1. The difference between this embodiment and Embodiment 1 lies in that, in a step 101 in this embodiment, deoxyribonuclease is at a concentration of 100 U/mL, and a further incubation is performed for 30 min.

Embodiment 7

The relevant steps are the same as those in Embodiment 1. The difference between this embodiment and Embodiment 1 lies in that, a hydrogel material in a step 102 in this embodiment is a gelatin methacryloyl hydrogel solution with a concentration of 10%.

Embodiment 8

The relevant steps are the same as those in Embodiment 1. The difference between this embodiment and Embodiment 1 lies in that, a hydrogel material in a step 102 in this embodiment is a silk fibroin methacryloyl hydrogel solution with a concentration of 12%.

Embodiment 9

The relevant steps are the same as those in Embodiment 1. The difference between this embodiment and Embodiment 1 lies in that, a hydrogel material in a step 102 in this embodiment is a collagen methacrylate hydrogel solution with a concentration of 2%.

Comparison Example 1

The relevant steps are the same as those in Embodiment 1. The difference between this comparison example and Embodiment 1 lies in that, this comparison example includes the following steps.

In a step 101, a hyaluronic acid methacrylate hydrogel solution at a concentration of 5% is prepared by using a solution of the photoinitiator LAP, and hyaluronic acid methacrylate hydrogel microspheres are prepared by microfluidic technique.

In a step 102, the hyaluronic acid methacrylate hydrogel microspheres are washed by using sterile deionized water.

In a step 103, the hyaluronic acid methacrylate extracellular matrix hydrogel microspheres are lyophilized to obtain lyophilized hyaluronic acid methacrylate extracellular matrix hydrogel microspheres.

Comparison Example 2

The relevant steps are the same as those in Embodiment 1. The difference between this comparison example and Embodiment 1 lies in that, this comparison example includes the following steps.

In a step 101, 18-month-old rat bone marrow MSCs are cultured in a culture dish at an inoculation density of 3000/cm$^2$; when a cell confluence reaches 90%, ascorbic acid at a concentration of 100 μM is added for induction for 8 d; then, a decellularization solution is added for incubation in an incubator for 5 min, the decellularization solution containing PBS at a volume fraction of 99.5%, Triton X-100 at a volume fraction of 0.5% and $NH_4OH$ at a concentration of 20 mM; the decellularization solution is removed, and a deoxyribonuclease at a concentration of 100 U/mL is added for incubation for 1 h; and washing is performed by PBS, and an extracellular matrix is collected by means of a cell scraper.

In a step 102, a hyaluronic acid methacrylate hydrogel solution at a concentration of 5% is prepared by using a solution of the photoinitiator LAP, and hyaluronic acid methacrylate hydrogel microspheres are prepared by microfluidic technique.

In a step 103, the extracellular matrix is lyophilized, fully ground, and well dissolved by using sterile deionized water.

In a step 104, the hyaluronic acid methacrylate hydrogel microspheres are immersed in a DMTMM solution, and stirring at room temperature and centrifugation are performed for three times so as to obtain a precipitate.

In a step 105, the hyaluronic acid methacrylate hydrogel microspheres are added into the extracellular matrix suspension for reaction on a shaker for 4 h.

In a step 106, hyaluronic acid methacrylate extracellular matrix hydrogel microspheres are collected and washed by using sterile deionized water.

In a step 107, the extracellular matrix hydrogel microspheres are lyophilized to obtain the hyaluronic acid methacrylate extracellular matrix hydrogel microspheres.

Figure 5:
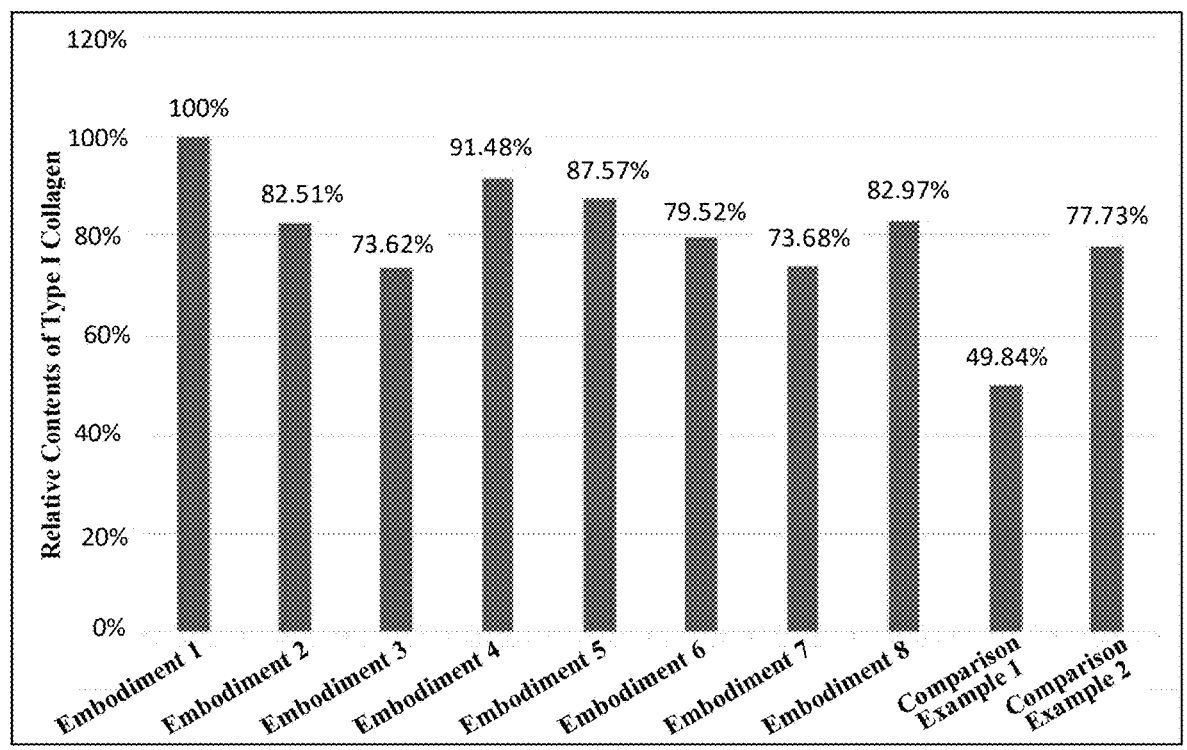
FIG. 5 is a graph showing relative contents of type I collagen in hydrogel microspheres in Embodiments 1 to 8 and Comparison Examples 1 to 2 of the present disclosure.

As shown in FIG. 5, by comparing a content of type I collagen in the extracellular matrix hydrogel microsphere prepared in Embodiment 1 with contents of type I collagen in the extracellular matrix hydrogel microspheres prepared in Embodiments 2 to 4, it is concluded that an optimal concentration of $NH_4OH$ in a decellularization solution is 20 mM, and an optimal incubation time is 5 min.

By comparing the content of type I collagen in the extracellular matrix hydrogel microsphere prepared in Embodiment 1 with contents of type I collagen in the extracellular matrix hydrogel microspheres prepared in Embodiments 5 and 6, it is concluded that an optimal concentration of a deoxyribonuclease is 100 U/mL, and an optimal incubation time is 1 h By comparing the content of type I collagen in the extracellular matrix hydrogel microspheres prepared in Embodiment 1 with contents of type I collagen in the extracellular matrix hydrogel microspheres prepared in Embodiments 7 to 8, it is concluded that, as a main material of a hydrogel microsphere, hyaluronic acid methacrylate, gelatin methacryloyl and collagen methacrylate each can carry an extracellular matrix and effectively promote bone repair.

By comparing the contents of type I collagen in the extracellular matrix hydrogel microspheres prepared in Embodiments 1 to 8 with contents of type I collagen in the extracellular matrix hydrogel microspheres prepared in Comparison Examples 1 and 2, it is concluded that, hydrogel microspheres without extracellular matrix, both hydrogel microspheres without extracellular matrix and hydrogel microspheres loaded with an extracellular matrix obtained from aged rats are significantly less effective in the repair of bone defects. This further illustrates an important role of an extracellular matrix in the maintenance of bone homeostasis.

Embodiment 10

Figure 2:
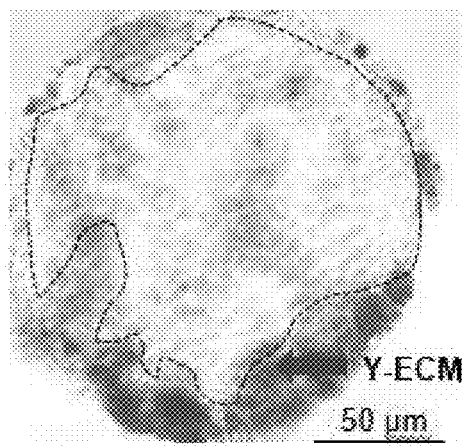
FIG. 2 shows Coomassie Brilliant Blue staining of the extracellular matrix hydrogel microsphere in Embodiment 1 of the present disclosure.

An extracellular matrix hydrogel microsphere as shown in FIG. 2 is provided. The extracellular matrix hydrogel microsphere is obtained by using the method for preparing an extracellular matrix hydrogel microsphere as described in any one of Embodiments 1 to 9, which successfully combines a stem cell-derived extracellular matrix with a microsphere, and achieves uniform particle size and good dispersibility. The prepared microspheres can promote the repair of bone defects while ensuring relatively good biocompatibility.

Embodiment 11

An application of the extracellular matrix hydrogel microsphere in Embodiment 10 in a product for repairing a bone defect is provided. For example, the product for repairing the bone defect is a product for repairing a senile cranial defect, which can contribute to the repair of a bone defect.

It will be readily understood that, on the basis of one or a plurality of embodiments provided in the present disclosure, a person skilled in the art can arrive at other embodiments by means of modification, such as combination, split and reorganization, of the embodiments of the present disclosure, and therefore none of these embodiments is beyond the scope of protection of the present disclosure.

The present disclosure and embodiments thereof are described schematically above. The description is not limiting, the embodiments are only parts of the implementation of the present disclosure, and actual structures are not limited thereto. Therefore, if a person of ordinary skill in the art is inspired by the present disclosure without departing from the inventive purpose of the present disclosure, and designs without creativity structural modes and implementations similar to the technical solutions in the present disclosure, all of the structural modes and the implementations shall fall within the scope of protection of the present disclosure.

What is claimed is:

1. A method for preparing extracellular matrix hydrogel microspheres, the method comprising:
   a. preparing a neonatal rat bone marrow mesenchymal stem cell-derived extracellular matrix by a method comprising the following steps:
   S1, inoculating neonatal rat-derived bone marrow mesenchymal stem cells into a cell culture dish, and culturing the inoculated neonatal rat-derived bone marrow mesenchymal stem cells using a complete medium until a cell density reaches 90%;
   S2, adding ascorbic acid at a concentration of 80-200 UM to the complete medium for induction for 3-10 d;
   S3, removing the complete medium and adding a decellularization solution for incubation;
   S4, removing the decellularization solution, and adding a deoxyribonuclease for further incubation;
   S5, removing the deoxyribonuclease;
   S6, washing with a phosphate buffer solution (PBS); and
   S7, using a cell scraper to collect the extracellular matrix;
   b. preparing hydrogel microspheres by a microfluidic technique comprising the following steps:
   S8, preparing a hydrogel precursor solution comprising deionized water and a photoinitiator as an aqueous phase, the hydrogel precursor solution comprising hyaluronic acid methacrylate with a concentration of 1%-5%, gelatin methacryloyl with a concentration of 5%-20%, silk fibroin with a concentration of 7.5%-20%, and collagen methacrylate with a concentration of 1%-20%;
   S9, uniformly mixing Span 80 with isopropyl myristate to serve as an oil phase;
   S10, filling the aqueous phase and the oil phase into respective injectors, and adjusting and controlling different flow rates by using syringe pumps to push out the aqueous phase and the oil phase at constant speeds, and curing the aqueous phase into stable spheres by exposure to ultraviolet radiation;
   S11, washing the surfaces of the hydrogel microspheres by using ethanol; and
   S12, collecting and lyophilizing the washed hydrogel microspheres;
   C. activating carboxyl groups on the surfaces of the hydrogel microspheres by a method comprising the following steps:
   S13, preparing a solution of 4-(4,6-dimethoxy-1,3,5-triazin-2-yl)-4-methylmorpholinium chloride (DMTMM) for use as a condensing agent;
   S14, immersing the hydrogel microspheres in the DMTMM solution; and
   S15, stirring and centrifuging the solution with hydrogel microspheres at room temperature to form activated hydrogel microspheres; and
   d. reacting the activated hydrogel microspheres with amino groups on the neonatal rat bone marrow mesenchymal stem cell-derived extracellular matrix to obtain the extracellular matrix hydrogel microspheres, by a method comprising the following steps:
   S16, performing lyophilization on the extracellular matrix;
   S17, thoroughly grinding the lyophilized extracellular matrix; and
   S18, adding the ground extracellular matrix to sterile deionized water to obtain an extracellular matrix suspension; and
   S19, adding the activated hydrogel microspheres to the extracellular matrix suspension for reaction on a shaker to form the extracellular matrix hydrogel microspheres.

2. The method for preparing the extracellular matrix hydrogel microsphere according to claim 1, wherein in S3, the decellularization solution contains PBS at a volume fraction of 99.5%, Triton X-100 at a volume fraction of 0.5% and NH4OH at a concentration of 20-35 mM, and an incubation time is 5-10 min; and in S4, a concentration of the deoxyribonuclease is 80-150 U/ml, and an incubation time is 1-3 h.

3. The method for preparing the extracellular matrix hydrogel microsphere according to claim 1, wherein in S13, the DMTMM solution is prepared by using sterile deionized water and has a concentration of 5-15 mg/mL, a stirring time at room temperature is 30-60 min, and the centrifugation is performed at 1200 r/min for 5 min at 4° C. and repeated three times.

4. The method for preparing the extracellular matrix hydrogel microsphere according to claim 1, wherein in S19, the reaction of reacting the activated hydrogel microspheres with the extracellular matrix suspension is performed at 4-25° C. for 3-8 h.

5. One or more extracellular matrix hydrogel microspheres prepared by using the method for preparing extracellular matrix hydrogel microspheres according to claim 1.

6. A method for treating a patient with a senile cranial defect, the method comprising the steps of adding extracellular matrix hydrogel microspheres prepared according to the method of claim 1 to a product for bone defect repair, and repairing the senile cranial defect with the product.

* * * * *